United States Patent
Kim et al.

(10) Patent No.: US 9,386,209 B2
(45) Date of Patent: Jul. 5, 2016

(54) METHOD AND APPARATUS FOR ESTIMATING POSITION

(71) Applicant: HANWHA TECHWIN CO., LTD., Changwon-Si (KR)

(72) Inventors: Dong Shin Kim, Changwon-si (KR); Jin Suk Park, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/336,415

(22) Filed: Jul. 21, 2014

(65) Prior Publication Data
US 2015/0213617 A1 Jul. 30, 2015

(30) Foreign Application Priority Data

Jan. 24, 2014 (KR) .................. 10-2014-0009167

(51) Int. Cl.
| | |
|---|---|
| *G06T 7/20* | (2006.01) |
| *H04N 5/225* | (2006.01) |
| *G06T 7/00* | (2006.01) |
| *G06K 9/00* | (2006.01) |
| *G06K 9/32* | (2006.01) |
| *G06K 9/62* | (2006.01) |
| *G06T 17/05* | (2011.01) |
| *H04N 101/00* | (2006.01) |

(52) U.S. Cl.
CPC .......... *H04N 5/2257* (2013.01); *G06K 9/00798* (2013.01); *G06K 9/3216* (2013.01); *G06K 9/6292* (2013.01); *G06T 7/0042* (2013.01);
(Continued)

(58) Field of Classification Search
USPC ....................... 701/2–20, 408–526
See application file for complete search history.

(56) References Cited

U.S. PATENT DOCUMENTS

| | | | | |
|---|---|---|---|---|
| 6,025,790 A | * | 2/2000 | Saneyoshi ............ | G05D 1/0251 244/17.11 |
| 8,208,021 B2 | * | 6/2012 | Unoura .............. | G06K 9/00798 348/148 |

(Continued)

FOREIGN PATENT DOCUMENTS

| | | |
|---|---|---|
| KR | 10-2004-0024624 A | 3/2004 |
| KR | 10-2012-0046974 A | 5/2012 |
| KR | 10-2012-0099952 A | 9/2012 |

OTHER PUBLICATIONS

Jung, Sang-Jun et al. "Stereo Vision-based Visual Odometry Using Robust Visual Feature in Dynamic Environment," Dec. 2008, pp. 263-269 Abstract.

*Primary Examiner* — Rami Khatib
*Assistant Examiner* — Timothy Newley
(74) *Attorney, Agent, or Firm* — Sughrue Mion, PLLC (57) ABSTRACT

Provided is a position estimation apparatus including: a position estimation unit configured to estimate a position of a moving object driven on an arbitrary lane according to an image frame captured by a stereo camera provided in the moving object; a posture information acquisition unit configured to obtain first posture information of the moving object from the estimated position and second posture information of the moving object at a point of time of the stereo camera capturing the image frame; a position correction unit configured to calculate: a probability distribution for a current position of the moving object by using the first posture information and the second posture information, and configured to correct a first probability of the probability distribution for the current position as a corrected position of the moving object; and a composite probability distribution based on a probability of a lane section of the arbitrary lane from a lane probability distribution chart and the corrected position output from the first position correction unit and configured to re-correct a second probability of the composite probability distribution as a final position of the moving object.

20 Claims, 5 Drawing Sheets

(52) U.S. Cl.
CPC .... *G06K 2009/3291* (2013.01); *G06K 2209/21* (2013.01); *G06T 7/2093* (2013.01); *G06T 17/05* (2013.01); *G06T 2207/20076* (2013.01); *G06T 2207/30244* (2013.01); *H04N 2101/00* (2013.01)

(56) References Cited

U.S. PATENT DOCUMENTS

| | | | |
|---|---|---|---|
| 8,532,862 B2* | 9/2013 | Neff | G05D 1/0255 180/167 |
| 2009/0202174 A1* | 8/2009 | Shiba | G06K 9/4633 382/282 |
| 2011/0210872 A1* | 9/2011 | Molander | G06S 11/12 340/961 |
| 2012/0106828 A1* | 5/2012 | Yoon | G06K 9/00664 382/153 |
| 2012/0123628 A1* | 5/2012 | Duggan | G05D 1/0061 701/24 |
| 2012/0150437 A1* | 6/2012 | Zeng | B60W 30/12 701/456 |
| 2014/0067256 A1* | 3/2014 | Aoki | G01C 21/30 701/417 |

* cited by examiner

METHOD AND APPARATUS FOR ESTIMATING POSITION

CROSS REFERENCE TO RELATED APPLICATION

This application claims priority from Korean Patent Application No. 10-2014-0009167, filed on Jan. 24, 2014, in the Korean Intellectual Property Office, the disclosure of which is incorporated herein by reference in its entirety.

BACKGROUND

1. Field

Apparatuses and methods consistent with exemplary embodiments relate to estimating a position of a mobile object which moves on a road.

2. Description of the Related Art

A robot may be an automatically controlled figure having a person-like appearance and operates like a human-being through a machine inside the figure. However, recently, any device which autonomously performs a task regardless of the appearance is commonly called a robot. In particular, a mobile robot has drawn a lot of attention because the mobile robot may work in extreme environments or dangerous regions. Furthermore, the mobile robots for home use, such as cleaning robots, are widely used.

In order for a mobile robot to automatically perform various tasks, the mobile robot needs to be capable of performing autonomous movement. In order to solve the autonomous movement issue of the robot, first, the robot should be able to determine its current position. That is, in order to for mobile robot to autonomously move while performing tasks, localization for self position recognition is essential. One type of localization technology is simultaneous localization and mapping (SLAM). The SLAM refers to a method of estimating the robot's absolute position while writing a map corresponding to a task-performing space by detecting surrounding environment information and processing the obtained information.

For position estimation of the existing robot, various sensors such as a global positioning system (GPS), light detection and ranging (LIDAR), and a camera have been applied along with odometry. However, the GPS may have frequent errors and operate only in an outdoor environment, and LIDAR may fail to estimate the robot's position due to non-reflection of light when used in a wide-open outdoor environment without any structures for the light to be reflected.

SUMMARY

One or more exemplary embodiments provide a method and apparatus for estimating a position of a mobile object which moves on a road by using an image captured by a stereo camera and an inexpensive inertial measurement unit (IMU).

Additional aspects will be set forth in part in the description which follows and, in part, will be apparent from the description, or may be learned by practice of the presented embodiments.

According to an aspect of an exemplary embodiment, provided is a position estimation apparatus including: a position estimation unit configured to estimate a position of a moving object driven on an arbitrary lane according to an image frame captured by a stereo camera provided in the moving object; a posture information acquisition unit configured to obtain first posture information of the moving object from the estimated position and second posture information of the moving object at a point of time of the stereo camera capturing the image frame; a position correction unit configured to calculate a probability distribution for a current position of the moving object by using the first posture information and the second posture information, configured to correct a first probability of the probability distribution for the current position as a corrected position of the moving object, configured to calculate a composite probability distribution based on a probability of a lane section of the arbitrary lane from a lane probability distribution chart and the corrected position output from the first position correction unit, and configured to re-correct a second probability of the composite probability distribution as a final position of the moving object.

The position estimation unit may include: an extraction unit configured to extract a feature point from each of first and second image frames; a matching unit configured to match the feature point of the second image frame to a corresponding feature point of the first image frame; a calculation unit configured to calculate a three-dimensional (3D) coordinate of the matched feature point; and a clustering unit configured to generate at least one motion cluster by grouping a motion vector representing a 3D coordinate space variation between the first image frame and the second image frame, based on a space correlation chart on a feature space; a noise removing unit configured to remove noise from each motion cluster; and a position estimation unit configured to estimate the position of the moving object by tracing relative positions of the first and second cameras calculated for the at least one motion cluster.

The position correction unit may be configured to obtain the probability of the lane section of the arbitrary lane from the lane probability distribution chart in which a lane width of the arbitrary lane is divided into a plurality of sections and a probability of the moving object being positioned in each section is differently set.

The first probability of the probability distribution may correspond to a largest probability of the probability distribution, and the second probability of the composite probability distribution may correspond to a largest probability of the composite probability distribution.

The posture information acquisition unit may be configured to obtain the first posture information including x, y, z, roll, yaw, and pitch of the moving object from the estimated position.

The posture information acquisition unit may be configured to obtain the second posture information including, x, y, z, roll, yaw, and pitch of the moving object from position information of the moving object.

The posture information acquisition unit may include an inertial measurement unit (IMU).

The position correction unit may be configured to calculate the probability distribution by using a factor graph algorithm which uses the first posture information and the second posture information as inputs.

The position estimation apparatus may further include: a memory configured to store a road information map and the lane probability distribution chart, which is predetermined for each lane, from the road information map.

The lane probability distribution chart may be configured to be set so that a central section of the lane is set to have largest probability, and probability of the lane probability distribution chart may be set to decrease toward an external end of the lane.

According an aspect to another exemplary embodiment, there is provided a position estimation method, the method including: estimating a position of a moving object driven on an arbitrary lane from an image frame captured by a stereo camera provided in the moving object; obtaining first posture information of the moving object from the estimated position; obtaining second posture information of the moving object at a point of time of the stereo camera capturing the image frame; calculating a probability distribution for a current position of the moving object by using the first posture information and the second posture information, and correcting a first probability of the probability distribution as a corrected position of the moving object; and calculating a composite probability based on a probability of a lane section of the arbitrary lane from a lane probability distribution chart and is the corrected position output from the first position correction unit and configured to re-correct a second probability of the composite probability as a final position of the moving object.

The estimating the position may include: extracting a feature point from each of first and second image frames; matching the feature point of the second image frame to a corresponding feature point of the first image frame; calculating a three-dimensional (3D) coordinate of the matched feature point; generating at least one motion cluster by grouping a motion vector representing a 3D coordinate space variation between the first image frame and the second image frame, based on a space correlation chart on a feature space; removing noise from each motion cluster; and estimating the position of the moving object by tracing relative positions of the first and second cameras calculated for the at least one motion cluster.

The position estimation method may further include obtaining the probability of the lane section of the arbitrary lane from the lane probability distribution chart in which a lane width of the arbitrary lane is divided into a plurality of sections and a probability of the moving object being positioned in each section is differently set.

The first probability of the probability distribution may correspond to a largest probability of the probability distribution, and the second probability of the composite probability distribution may correspond to a largest probability of the composite probability distribution.

The obtaining the first posture information may include obtaining the first posture information including x, y, z, roll, yaw, and pitch of the moving object from the estimated position.

The obtaining the second posture information may include obtaining the second posture information including, x, y, z, roll, yaw, and pitch of the moving object from position information of the moving object.

The second posture information may be obtained by an inertial measurement unit (IMU).

The correcting the first position may include calculating the probability distribution by using a factor graph algorithm which uses the first posture information and the second posture information as inputs.

The position estimation method may further include: storing a road information map and the lane probability distribution chart, which is predetermined for each lane, from the road information map.

The lane probability distribution chart may be configured to be set so that a central section of the lane is set to have largest probability, and probability of the lane probability distribution chart may be set to decrease toward an external end of the lane.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

Terms such as "first" and "second" may be used to describe various components, but the components are not limited by the terms. Such terms are used only to distinguish one component from another.

The terms used in the present application are used only to describe a certain embodiment, but are not used to limit the scope of rights of the inventive concepts. A singular expression includes a plurality of expressions unless clearly stated otherwise.

The inventive concept may be represented by block components and various process operations. Such functional blocks may be implemented by various numbers of hardware and/or software components which perform specific functions. For example, the inventive concept may adopt integrated circuit components such as a memory, a process, logic, and a look-up table for executing various functions by control of one or more microprocessors or other control devices. As the components of the instant Application may be executed by software programming or software components, the inventive concept may be implemented in programming or scripting languages such as C, C++, Java, and assembler as well as various algorithms which are implemented by a combination of data structures, processes, routines, and other programming components. The functional aspects may be implemented by algorithms which are executed in one or more processors. Furthermore, the inventive concepts may adopt the existing technologies for electronic environment setting, signal processing, and/or data processing, etc. Terms such as mechanism, element, means, and component may be widely used, and are not limited to mechanical and physical components. The terms may include a series of routines of software linked with a processor.

Figure 1:
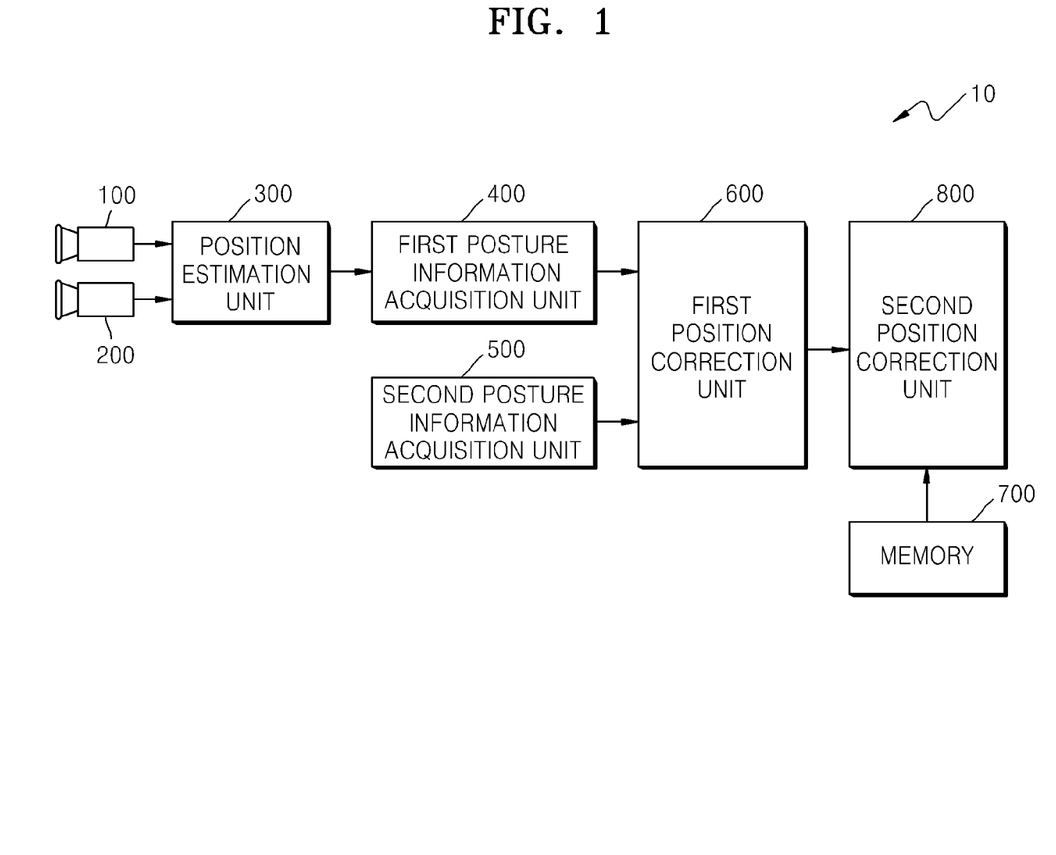
FIG. 1 is a block diagram illustrating a configuration of an apparatus for estimating a position according to an exemplary embodiment.

FIG. 1 is a block diagram illustrating a configuration of an apparatus for estimating a position according to an exemplary embodiment.

Referring to FIG. 1, a position estimation apparatus 10 includes a first camera 100, a second camera 200, a position estimation unit 300, a first posture information acquisition unit 400, a second posture information acquisition unit 500, a first position correction unit 600, a memory 700, and a second position correction unit 800.

The first camera 100 and the second camera 200 refer to a left camera and a right camera which capture a subject by using, for example, a complementary metal-oxide semiconductor (CMOS) module or a charge coupled device (CCD) module, and first and second input images are provided to the CMOS module or CCD module through a lens, and the CMOS module or CCD module outputs first and second image frames which are generated by converting light signals of the subject, which have passed through the lens, into electric signals.

The position estimation unit 300 estimates the position of the moving object from the first and second image frames captured by the first camera 100 and the second camera 200 included in the mobile object which moves on an arbitrary lane.

Figure 2:
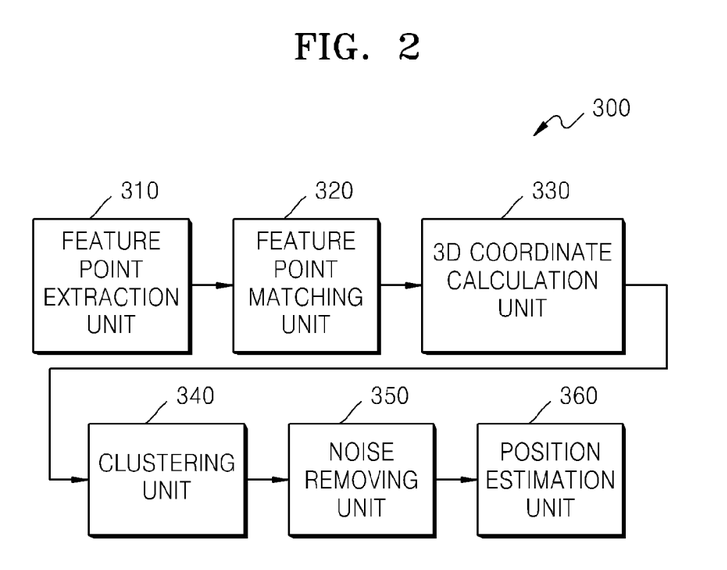
FIG. 2 is a block diagram illustrating a position estimation unit according to an exemplary embodiment.

FIG. 2 illustrates the position estimation unit 300 in detail. Referring to FIG. 2, the position estimation unit 300 includes a feature point extraction unit 310, a feature point matching unit 320, a three (3)-dimensional (3D) coordinate calculation unit 330, a clustering unit 340, a noise removal unit 350, and a position estimation unit 360.

The feature point extraction unit 310 extracts feature points from the first and second image frames, respectively. For example, the feature points may be extracted by using a Kanade-Lucas-Tomasi (KLT) tracker and a Harris corner detector.

The feature point matching unit 320 matches a feature point of the second image frame corresponding to a feature point of the first frame. For example, the feature point may be matched by using Epipolar geometry or a region-based matching method.

The 3D coordinate calculation unit 330 calculates 3D coordinates of the matched feature points and may use a triangulation scheme. The 3D coordinate calculation unit 330 calculates two (2)-dimensional (2D) coordinates of the feature point, i.e., an x-coordinate and a y-coordinate, from the first image frame and the second image frame and calculates the distance from the first camera 100 and the second camera 200 to the feature point so as to calculate the distance as a depth value, i.e., a z-coordinate, thereby finally obtaining the 3D coordinates.

Figure 3:
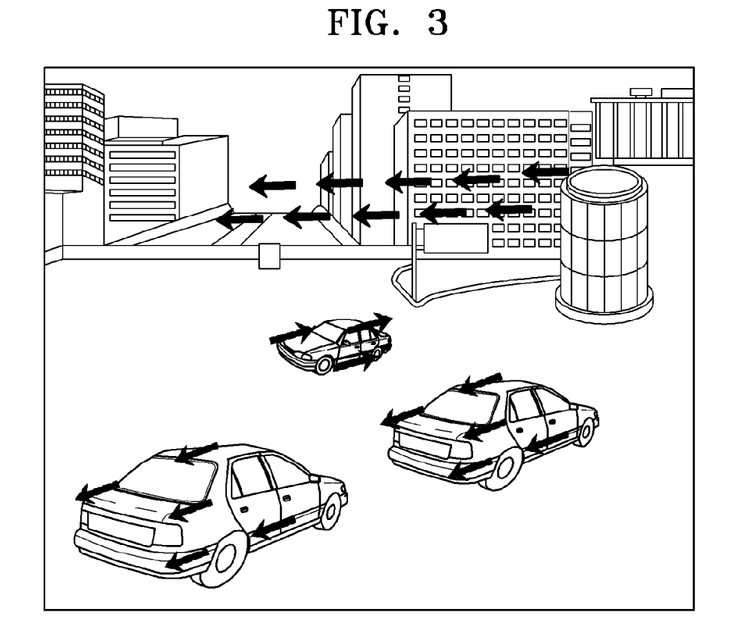
FIG. 3 illustrates an example in which a vector is displayed by matching feature points of a 3D image frame according to an exemplary embodiment.

The clustering unit 340 may calculate the motion vector, i.e. the variation of the actual space through the 3D coordinate of the previous 3D image frame and the 3D coordinate of the current 3D image frame and perform spatially coherent motion clustering so as to make the static background and a plurality of movements as a set. FIG. 3 shows an example where a 3D motion vector of the matched feature point is displayed in the 3D image frame.

Figure 4:
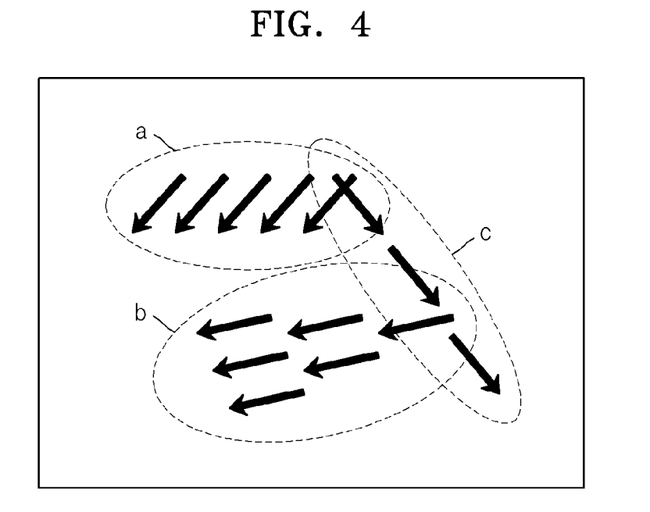
FIG. 4 illustrates an example of a configuration of a motion cluster of a 3D image frame according to an exemplary embodiment.

The clustering unit 340 also forms one or more motion clusters by grouping vectors based on a space correlation diagram on a feature space by using the moving direction of the motion vector as the parameter. FIG. 4 shows an example where vectors displayed on the previous or current 3D image frames are formed as three motion clusters a, b, and c.

The clustering unit 340 may perform motion clustering by applying a Markov Random Field (MRF) optimization algorithm on the grid formed of triangles generated by a Delaunay triangulation scheme. Here, the graph-cut scheme may be used for MRF optimization.

The noise removal unit 350 forms one or more motion clusters, from which the noise has been removed, by removing the outlier for each formed motion cluster. The outlier is a vector with a high error (a vector with a significantly low consistency, corresponding to "c" of FIG. 4), and is a noise including a sensor outlier generated by a sensor noise and a motion outlier generated by the moving object. In the exemplary embodiment, the outlier may be removed by applying a random sample consensus (RANSAC) to each motion cluster.

The position estimation unit 360 estimates the position of the moving object by estimating the relative position of the camera which is calculated for each motion cluster under the assumption that the moving object moves at a constant speed. At this time, the extended Kalman filter algorithm may be applied. The position estimation unit 360 may calculate translation information indicating straight-line motion on the 3D coordinate axis and the rotation information indicating the rotation motion around the 3D coordinate axis with the variation between the 3D coordinates of the previous image frame and the 3D coordinates of the current image frame, and may then estimate the calculated information as the position of the moving object.

A first posture information acquisition unit 400 obtains first posture information of the moving object from translation information and rotation information which is the variation between the 3D coordinates of the previous image frame and the 3D coordinates of the current image frame, which is output from the position estimation unit 360. Here, the first posture information may include x, y, and z obtained from the translation information, and a roll, yaw, and pitch obtained from the rotation information. Here, a roll value may be defined as an angle of rotation in a counterclockwise direction on the basis of the x-axis, a yaw value may be defined as an angle of rotation in a counterclockwise direction on the basis of the y-axis, and a pitch value may be defined as an angle of rotation in a counterclockwise direction on the basis of the z-axis. The moving direction of the moving object may be obtained through the yaw value, and the moving direction may be obtained through the pitch value when moving on a sloping road.

A second posture information acquisition unit 500 obtains the second posture information of the moving object at points of time when the first camera 100 and the second camera 200 capture an image frame (the point of time when the previous image frame is captured and the point of time when the current image frame is captured). Here, the second posture information acquisition unit 500 may include an inertial measurement unit (IMU). The IMU as the second posture information acquisition unit 500 may include one or more acceleration sensors and one or more gyro sensors so that x, y, and z values may be measured by the acceleration sensors and the roll, yaw, and pitch values may be measured by the gyro sensors. The IMU is a device which calculates the current position, speed, and moving direction of the moving object by measuring the acceleration of the moving object and performing consecutive integrations, and makes a standard table which maintains a constant posture for the inertial space using a gyro sensor and mounts a minute acceleration sensor on the moving object. Unlike the GPS, the IMU obtains necessary information through the sensors installed inside the main body without external help. The IMU is not affected by the landform or weather, etc. and may obtain posture information which is difficult to be implemented by the GPS due to the self-position-determination characteristic without external help, and thus the IMU is an essential device to a moving object which needs the position and posture information.

Furthermore, the IMU is more advantageous than the GPS in that the position and posture may be sensed without electric wave interference.

A first position correction unit 600 calculates a probability distribution for the current position of the moving object by using the first posture information (x, y, z, roll, yaw, pitch) which is output from the first posture information acquisition unit 400 and the second posture information (x, y, z, roll, yaw, pitch) which is output from the second posture information acquisition unit 500, and corrects the first probability from among the calculated probability distribution as the position of the moving object so as to be output. Here, the first probability represents the largest probability from among the calculated probability distribution. For example, the first position correction unit 600 may correct the position of the moving object by using a factor graph algorithm.

The factor graph algorithm performed in the first position correction unit 600 is a method of estimating the position of the moving object using the probability distribution, and estimates the position of the moving object as the portion with a high density by extracting the sampling using the probability density.

Figure 5A:
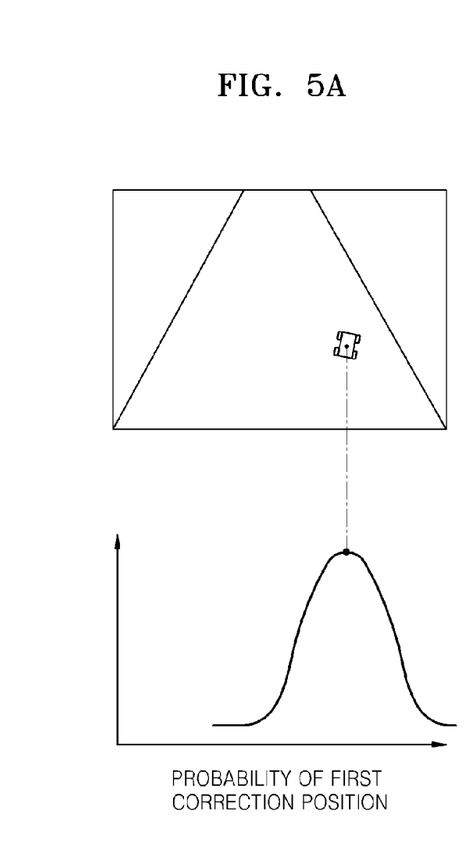
FIGS. 5A-5C illustrate position correction of a moving object according to an exemplary embodiment.

The factor graph algorithm method may include a prediction operation and a measurement-update operation. In the measurement-update operation, when a moving object moves, movement information (first posture information) is input, and because uncertainty is included, even if the previous position (t−1) is accurate, the current position (t) is shown as the probability distribution. At this time, the position of the moving object at the current point of time (t) may be calculated as the probability distribution by applying the second posture information as the movement model. Furthermore, the uncertainty of the distance information of the object positioned around the moving object is low and thus the distance information is relatively accurate, and thus if the final probability distribution is obtained by applying the sensor (not shown) to this distance information, the uncertainty is reduced. The first position correction unit 600 corrects the largest probability from among the obtained final probability distribution as the current position of the moving object. FIG. 5A illustrates the first position correction unit 600 correcting the largest probability as the current position of the moving object for the moving object which is moving on an arbitrary lane from among two or more lanes.

Figure 5B:
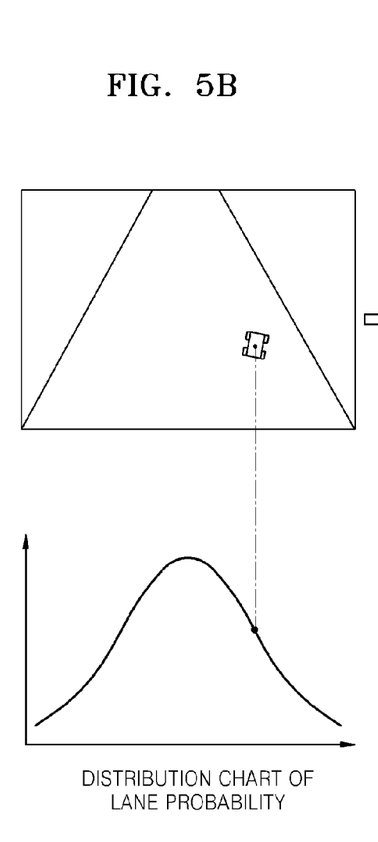

A memory 700 stores a road information map, and a lane probability distribution chart which is predetermined for each lane from the road information map and the direction of the moving object according thereto. Here, in the lane probability distribution chart, the arbitrary lane width is divided into a plurality of sections, and the probability of the moving object being positioned in each section is differently set. For example, in the lane probability distribution chart of FIG. 5B, an arbitrary lane width is divided into a plurality of sections, and the probability of the moving object being positioned at each section is differently set. Here, when the probability is set, for example, as the probability of the center section of the lane is the largest, the probability may be set to be smaller toward an external end of the lane. Furthermore, the direction of the moving object may be changed according to the probability distribution, and as the probability increases, the probability that the moving object is driven in a forward direction increases. In the case of FIG. 5B, the moving object is not positioned in the central section of the highest probability, but is positioned in the external section, and the probability, which is set in the section where the moving object is positioned, may be applied to the next second position correction unit 800.

Figure 5C:
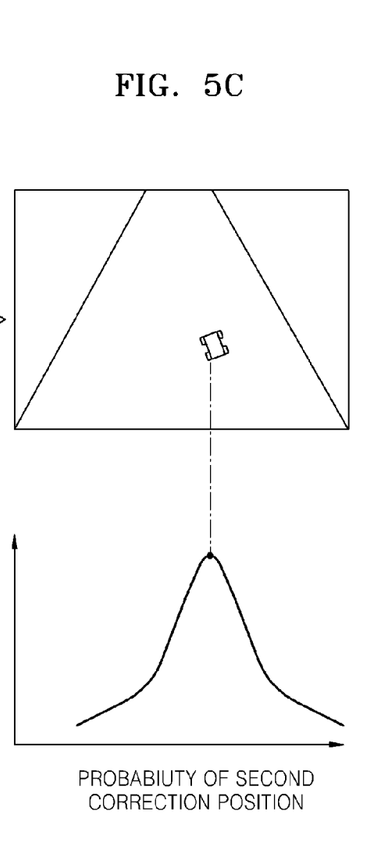

A second position correction unit 800 calculates the composite probability distribution from the position probability of the moving object output from the first position correction unit 600 and the probability of the lane section where the moving object which is output from the memory 700 is positioned, and corrects the second probability, from the composite probability distribution, as the final position of the moving object. Here, the second probability represents the largest probability from among the composite probability. The reason for the second position correction is to more accurately estimate the position of the moving object by using preset road information for the moving object which is driven on a lane. The position of the moving object is finally corrected to the position having the highest (second) probability from among the composite probability as in FIG. 5C by composing the probability of the current position of the moving object illustrated in FIG. 5A and the probability that the moving object illustrated in FIG. 5B is positioned in an arbitrary lane section.

Likewise, the position of the moving object for driving on a road may be accurately estimated by using the image captured by a stereo camera and an inexpensive inertia measuring device.

Figure 6:
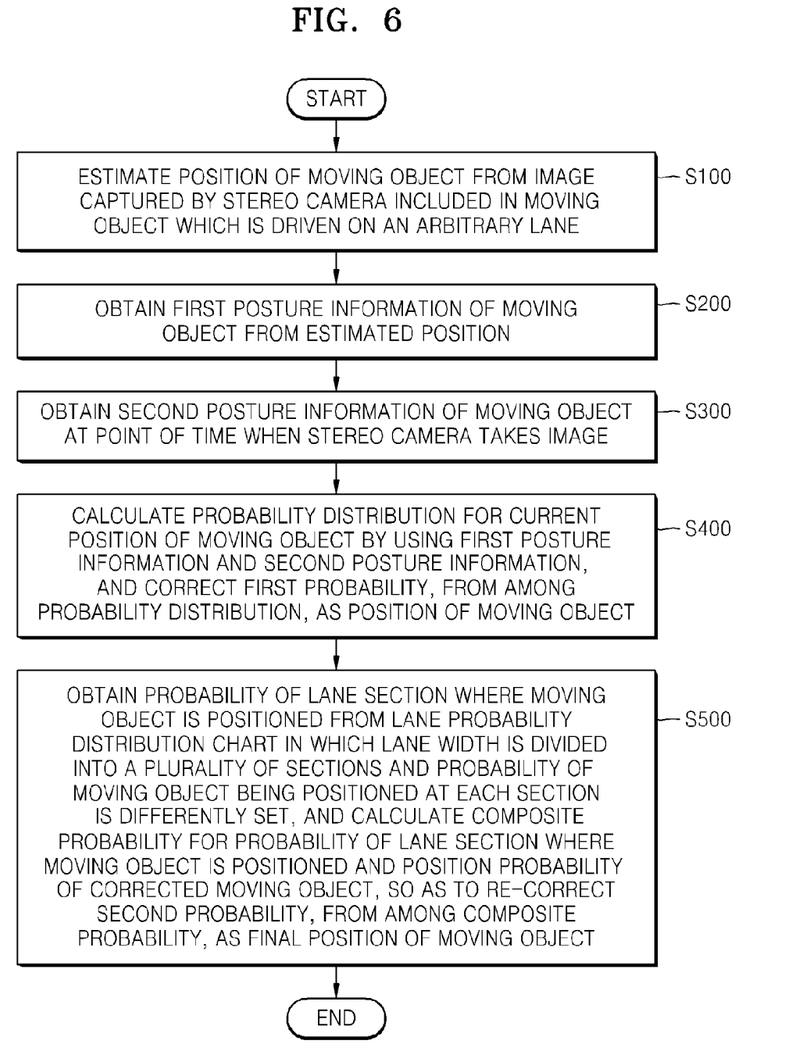
FIG. 6 is a flowchart illustrating the operation of a position estimation method according to an exemplary embodiment.

FIG. 6 is a flowchart illustrating an operation of a position estimation method according to an exemplary embodiment. Descriptions given above will not be repeated here.

The position estimation device 10 performs operation S100 of estimating the position of the moving object from the image captured by a stereo camera included in the moving object which is driven in an arbitrary lane. For position estimation of the moving object, feature points are extracted from each of the first and second image frames captured by the stereo camera, and the feature points of the second image frame corresponding to the feature points of the first image frame are matched. After the matching of the feature points, the position estimation device 10 calculates three-dimensional (3D) coordinates by calculating two-dimensional (2D) coordinates of the feature points, i.e., x-coordinate and y-coordinate, from the first image frame and the second image frame, respectively, and setting the distance, which is obtained by calculating the distance from the camera to the feature points by triangulation, as the depth, i.e., z-coordinate. After calculating the 3D coordinate, the position estimation device 10 forms one or more motion clusters by calculating the motion vector, i.e. the variation of the actual space through the 3D coordinate of the previous 3D image frame and the 3D coordinate of the current 3D image frame, and grouping the vector based on the spatial correlation on the feature space which uses the moving direction of the motion vector as the parameter. Thereafter, the position estimation device 10 forms one or more motion clusters from which the noise has been removed, by removing an outlier for each formed motion cluster. The position estimation device 10 may then estimate the position of the moving object by tracing the relative position of the camera which is calculated for each motion cluster assuming that the moving object is driven at a constant speed. Here, the translation information indicating the rectilinear movement for the 3D coordinate and the rotation information indicating the rotation information around the 3D coordinate axis are calculated by the variation of the 3D coordinates of the previous image frame and 3D coordinates of the current image frame, and a result of the calculating is estimated as the position of the moving object.

If the position estimation of the moving object is completed, the position estimation device 10 performs operation S200 of obtaining the first posture information of the moving object from the estimated position. Here, first posture information is the variation of the 3D coordinate of the previous image frame and the 3D coordinate of the current image frame, and may include x, y, and z obtained from the translation information and the roll, yaw, and pitch obtained from rotation information.

Furthermore, the position estimation device 10 performs operation S300 of obtaining the second posture information of the moving object which is measured by the IMU at the point of time when the stereo camera captures an image. The second posture information may include x, y, and z measured by the acceleration sensor included in the IMU and the roll, yaw, and pitch measured by the gyro sensor.

Thereafter, the position estimation device 10 performs operation S400 of calculating the probability distribution on the current position of the moving object by using first posture information and second posture information, and correcting the first probability, from among the probability distribution, as the position of the moving object. The position estimation device 10 performs the factor graph algorithm by using the first posture information (x, y, z, roll, yaw, and pitch) and second posture information (x, y, z, roll, yaw, and pitch) as the input, and corrects the largest probability (first probability), from among the calculated probability distribution, as the current position of the moving object.

After the current position correction of the moving object is completed, the position estimation device 10 performs operation S500 of re-correcting the second probability, from among the composite probability, as the final position, by obtaining the probability of the lane section where the moving object is positioned from the lane probability distribution in which the lane width is divided into a plurality of sections and the probability of the moving object being positioned in each section is differently set, and calculating the composite probability for the probability of the lane section where the moving object is positioned and the position probability of the corrected moving object. The position estimation device 10 stores the road information map and the lane probability distribution which is predetermined for each lane from the road information map. Here, the lane probability distribution indicates that an arbitrary lane width is divided into a plurality of sections, and the probability of the moving object being positioned at each section is differently set. When the probability is set, the probability of the center section of the lane may be set to be largest, and the probability may be set to decrease toward the external end of the lane. The position estimation device 10 calculates the composite probability from the position probability of the moving object and the probability of the lane section where the moving object is positioned, and corrects the largest probability (second probability), from among the composite probability, as the final position of the moving object. Here, the second position is corrected in order to more accurately estimate the position of the moving object by using preset road information for the moving object which is driven on a lane.

As described above, according to the one or more of the above exemplary embodiments, the position of a mobile object which moves on a road may be accurately estimated by using an image captured by a camera and an inexpensive IMU.

In addition, other exemplary embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

Components, elements or units represented by a block as illustrated in FIGS. 1 and 2 may be embodied as the various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like.

Also, according to other exemplary embodiments, two or more components, elements or units illustrated in FIGS. 1 and 2 may be combined into one single component, element or unit to perform all the functions performed at the two or more components, elements or units, and various functions of one component, element or unit may be performed at different components, elements or units.

It should be understood that the exemplary embodiments described herein should be considered in a descriptive sense only and not for purposes of limitation. Descriptions of features or aspects within each embodiment should typically be considered as available for other similar features or aspects in other embodiments.

While exemplary embodiments have been particularly shown in described above, it will be understood by those of ordinary skill in the art that various changes in form and details may be made therein without departing from the spirit and scope of the present inventive concept as defined by the following claims.

What is claimed is:

1. A position estimation apparatus comprising one or more processors configured to implement:
   a position estimation unit configured to estimate a position of a moving object driven on an arbitrary lane according to an image frame captured by a stereo camera provided in the moving object;
   a posture information acquisition unit configured to obtain first posture information of the moving object from the estimated position and second posture information of the moving object at a point of time of the stereo camera capturing the image frame;
   a position correction unit configured to calculate a first probability distribution for a position of the moving object by using the first posture information and the second posture information, configured to correct the estimated position based on the first probability distribution, configured to calculate a composite probability distribution using the first probability distribution and a second probability distribution which shows probabilities of the moving object being positioned in lane sections of the arbitrary lane from a lane probability distribution chart in which a lane width of the arbitrary lane is divided into a plurality of sections, and configured to re-correct the corrected estimated position based on the composite probability distribution.

2. The position estimation apparatus of claim 1, wherein the position estimation unit comprises:
an extraction unit configured to extract a feature point from each of first and second image frames;
a matching unit configured to match the feature point of the second image frame to a corresponding feature point of the first image frame;
a calculation unit configured to calculate a three-dimensional (3D) coordinate of the matched feature point; and
a clustering unit configured to generate at least one motion cluster by grouping a motion vector representing a 3D coordinate space variation between the first image frame and the second image frame, based on a space correlation chart on a feature space;
a noise removing unit configured to remove noise from each motion cluster; and
a position estimation unit configured to estimate the position of the moving object by tracing relative positions of the first and second cameras calculated for the at least one motion cluster.

3. The position estimation apparatus of claim 1, wherein the second probability distribution shows that a probability of a position of the moving object varies with the lane sections.

4. The position estimation apparatus of claim 1, wherein the position correction unit is configured to correct the estimated position to have a largest probability in the first probability distribution, and re-correct the corrected estimated position
to have a largest probability in the composite probability distribution.

5. The position estimation apparatus of claim 1, wherein the posture information acquisition unit is configured to obtain the first posture information including x, y, z, roll, yaw, and pitch of the moving object from the estimated position.

6. The position estimation apparatus of claim 1, wherein the posture information acquisition unit is configured to obtain the second posture information including, x, y, z, roll, yaw, and pitch of the moving object from position information of the moving object.

7. The position estimation apparatus of claim 1, wherein the posture information acquisition unit comprises an inertial measurement unit (IMU).

8. The position estimation apparatus of claim 1, wherein the position correction unit is configured to calculate the first probability distribution by using a factor graph algorithm which uses the first posture information and the second posture information as inputs.

9. The position estimation apparatus of claim 1, further comprising:
a memory configured to store a road information map and a probability distribution of lane sections of each of lanes included in the road information map.

10. The position estimation apparatus of claim 1, wherein the second probability distribution is configured to be set so that a central section of the arbitrary lane is set to have largest probability, and probability in the second probability distribution is set to decrease toward an external end of the arbitrary lane.

11. A position estimation method comprising:
estimating a position of a moving object driven on an arbitrary lane from an image frame captured by a stereo camera provided in the moving object;
obtaining first posture information of the moving object from the estimated position;
obtaining second posture information of the moving object at a point of time of the stereo camera capturing the image frame;
calculating a first probability distribution for a position of the moving object by using the first posture information and the second posture information;
correcting the estimated position based on the first probability distribution; and
calculating a composite probability using the first probability distribution and a second probability distribution which shows probabilities of the moving object being positioned in lane sections of the arbitrary lane from a lane probability distribution chart in which a lane width of the arbitrary lane is divided into a plurality of sections; and
re-correcting the corrected estimated position based on the composite probability distribution.

12. The position estimation method of claim 11, wherein the estimating the position comprises:
extracting a feature point from each of first and second image frames;
matching the feature point of the second image frame to a corresponding feature point of the first image frame;
calculating a three-dimensional (3D) coordinate of the matched feature point;
generating at least one motion cluster by grouping a motion vector representing a 3D coordinate space variation between the first image frame and the second image frame, based on a space correlation chart on a feature space;
removing noise from each motion cluster; and
estimating the position of the moving object by tracing relative positions of the first and second cameras calculated for the at least one motion cluster.

13. The position estimation method of claim 11, wherein the second probability distribution shows that a probability of a position of the moving object varies with the lane sections.

14. The position estimation method of claim 13, further comprising:
storing a road information map and a probability distribution of lane sections of each of lanes included in the road information map.

15. The position estimation method of claim 11, wherein the correcting the estimated position comprises correcting the estimated position to have a largest probability in the first probability distribution, and wherein the re-correcting the corrected estimated position comprises re-correcting the corrected estimated position to have a largest probability in the second probability distribution.

16. The position estimation method of claim 11, wherein the obtaining the first posture information comprises obtaining the first posture information including x, y, z, roll, yaw, and pitch of the moving object from the estimated position.

17. The position estimation method of claim 11, wherein the obtaining the second posture information comprises obtaining the second posture information including, x, y, z, roll, yaw, and pitch of the moving object from position information of the moving object.

18. The position estimation method of claim 11, wherein the correcting the estimated position comprises calculating the first probability distribution by using a factor graph algorithm which uses the first posture information and the second posture information as inputs.

19. The position estimation method of claim 18, wherein the second posture information is obtained by an inertial measurement unit (IMU).

20. The position estimation method of claim 11, wherein the second probability distribution is configured to be set so that a central section of the arbitrary lane is set to have largest probability, and probability in the second distribution is set to decrease toward an external end of the arbitrary lane.

* * * * *